United States Patent [19]

Mikarai

[11] 4,162,758
[45] Jul. 31, 1979

[54] METHOD FOR PRODUCING CLAD STEEL PIPES

[75] Inventor: Makoto Mikarai, Chiba, Japan

[73] Assignees: Asahi Kasei Kogyo Kabushiki-Kaisha; The Japan Steel Works, Ltd., both of Tokyo, Japan

[21] Appl. No.: 819,132

[22] Filed: Jul. 26, 1977

[30] Foreign Application Priority Data

Jul. 26, 1976 [JP] Japan ............................. 51-88109
Dec. 24, 1976 [JP] Japan ............................ 51-154911

[51] Int. Cl.² ........................................... B23K 19/00
[52] U.S. Cl. .............................. 228/131; 228/173 A; 228/243; 228/158; 228/209
[58] Field of Search ............. 228/126, 128, 131, 186, 228/173 A, 107, 243, 158, 209

[56] References Cited

U.S. PATENT DOCUMENTS

| | | | |
|---|---|---|---|
| 1,896,411 | 2/1933 | Maskrey | 228/235 X |
| 3,001,059 | 9/1961 | Jones | 228/186 X |
| 3,140,537 | 7/1964 | Popoff | 228/131 X |
| 3,228,103 | 1/1966 | Shewmon | 228/186 X |
| 3,316,630 | 5/1967 | Goedecke et al. | 228/131 |
| 3,862,484 | 1/1975 | Chivinsky | 228/263 X |

FOREIGN PATENT DOCUMENTS 560343 10/1932 Fed. Rep. of Germany ........... 228/126

Primary Examiner—C. W. Lanham
Assistant Examiner—K. J. Ramsey
Attorney, Agent, or Firm—Armstrong, Nikaido, Marmelstein & Kubovcik

[57] ABSTRACT

A long length clad steel pipe which is in the extremely superior metallurgically bonded state and having good qualities can be manufactured easily at an inexpensive cost by using as a base metal, a carbon steel including a low alloyed steel and as a cladding metal, a stainless steel, nickel or a nickel alloy by the steps comprising welding at least one end part of double pipes consisting of a base metal and a cladding metal, and subjecting the processed double pipes to hot rolling at a temperature between 850° C. to 1300° C. with a reduction ratio of at least 15% in the first step rolling.

9 Claims, 7 Drawing Figures

METHOD FOR PRODUCING CLAD STEEL PIPES

DESCRIPTION OF THE INVENTION

This invention relates to a method for producing a clad pipe having good bond percentage even in the case of a long pipe, by pressure-bonding pipes coaxially placed in a loose or close fitting relationship or metallurgical bonding through hot rolling process.

There have been heretofore known, among production methods of clad steel plates, explosion method, rolling method, the casting method and the like. Since the objective materials of these production methods are flat shape plate, there are relatively few problems in the production technique.

Whereas for producing a clad steel in a pipe shape, each method has a number of its own problems because the objective substance is a curved surface.

Firstly, in case of explosion bonding, the production of a pipe having a length of 6 m which is considered as a regular length is almost impossible. Even in case of those having a length of about 3 m, difficulties accompany the production technique, and even when production is made, it is not possible to obtain those which are sufficient in qualities. For example, there has been a proposal for producing a long length clad steel pipe by rolling a clad steel pipe produced after explosion bonding (see Zairyo Kako vol. 12, No. 2 page 72), but if the length of the clad steel pipe bonded by explosion exceeds one meter, the number of non-bonded areas gradually increases and clad steel pipes having a good percentage of metallurgical bond cannot be obtained. Clad steel pipes produced by way of explosion bonding have a poor percentage of metallurgical bond, and simple rolling of these clad steel pipes cannot substantially increase the percentage of metallurgical bond.

When a conventional rolling method is employed, two pipes are inserted coaxially and subjected to a hot or cold rolling, but according to that method, a metal bond cannot be expected and only those close to a so-called co-drawn clad steel pipe can be produced.

In a casting method, the bond strength of clad steel is weak and because of casting, the metal is in the casting structure and has poor deformability, and abundant in cavities, and further sometimes even penetrating holes are formed and hence the products are hardly used in practice.

In view of the above-mentioned drawbacks of conventional methods for producing clad steel pipes, it is an object of the present invention to provide a method for producing long clad steel pipes having a metal bond over the entire length.

The above-mentioned object can be attained by the method of the present invention. According to the method of the present invention, composite pipes consisting of carbon steel including low alloyed steel as a base metal and stainless steel, nickel or nickel alloy as a cladding metal are subjected to hot rolling.

In the case of production of clad steel pipes having a good percentage of metallurgical bond by rolling clad steel pipes having partial non-bond areas, a cladding metal is used for the inside of the tubular material and the non-bond area of the end parts are sealed by welding and the clad steel pipe is hot-rolled at a temperature between 850° C. to 1300° C. according to the method of the present invention.

It has been also been found in the case of the use of double pipes which are in a close or loose fitted relationship where a clad metal is fitted on the inside or the outside or both sides of a tubular or rod base metal, that good clad steel pipes can be obtained by fixing at least one end part of a cladding metal and a base metal firmly by means of welding and hot rolling the double pipes at a temperature between 850° C. to 1300° C.

The close fitted state or relationship referred to herein means the state of the double pipes where the base metal pipe and the cladding metal pipe are not metallurgically bonded, but are processed by means of an explosion force, mechanical press, shrinkage fitting, etc. so that the two pipes have almost no clearance therebetween. On the other hand, the loose fitted state or relationship referred to herein means the state of the double pipes where the base metal pipe and the cladding metal pipe form double pipes by inserting the latter into the former or inserting the former into the latter or inserting two of the former on both of the sides of the latter. Usually the clearance therebetween is in the range of 0.1–7 mm.

In completing the method of the present invention, search for referential prior art has been made.

On page 1097 of a publication "Handbook of metal surface technique issued by Nikkan Kogyo Shinbunsha on Feb. 20, 1972", there is described a technique of inserting a nickel plated or iron plated layer between a cladding material and a base metal.

Secondly, the specification of U.S. Pat. No. 3,729,805 discloses the production of one sided or both sided clad steel by charging scrap iron in a mold which is supposed to be a base metal and bonding a stainless steel on one side or both sides thereof and subjecting the resulting product to hot roll milling. However, this patent deals with plates.

Further, the specification of U.S. Pat. No. 3,678,567 discloses a method in which a pipe prepared from powder metal and another pipe prepared by various kinds of alloy steel are brought to a loose fitted state, one to the other, and the resultant combined pipes are subjected to hot reducing work to produce a composite pipe or rod.

As for the hot rolling method of pipes, there have been known methods in which an Assel mill, Plug rolling mill, Mandrel mill or Pilger mill are used for rolling after passing through a hot piercing mill (or rotary rolling mill) (see: Handbook of iron and steel issued from iron and steel society on Apr. 5, 1962).

As for methods for producing clad steel pipes, there is disclosed in the specification of Japanese patent application No. 80866 of 1976, entitled a method for producing clad steel pipes of a long length and filed by the present applicant, a production method of long length clad steel pipes from a base metal of carbon steel and a cladding metal of stainless steel, nickel or nickel alloy by using a hot rolling mill. The method of this patent application is characterized by making grooves on the surfaces of both of the ends of the carbon steel, inserting by pressure a cladding metal therein to form close fitted double pipes, sealing both the end surfaces of the close fitted double pipes by welding and then subjecting said pipes to rolling with a hot piercing mill having revolving plugs at a temperature of 1200° C. to 850° C. and further to rolling with a plug rolling mill or an Assel rolling mill with or without removing air between the close fitted double pipes.

According to the method of Japanese patent application No. 80866 of 1976 a clad steel having a considerably good percentage of bond can be obtained, but the yield obtained by this method is poor because of provision of grooves on both of the ends of the raw materials for rolling, and since the first reduction ratio is not taken into consideration, the percentage of bond is only to an extent of 90% on average.

Based upon these conventional arts, we have repeated the deliberation and experimentation, and completed the method of the present invention.

When clad steel pipes having good percentage of bond are to be made by rolling from clad steel pipes having partial non-bond area, a cladding metal is put in the inside of a base metal, the end parts having non-bond areas are sealed by welding and the double pipes are hot rolled at a temperature between 850° C. to 1300° C. with or without removing the air existing between the cladding metal and the base metal. Alternatively, when double pipes in which a cladding metal is hardly or entirely not in the state of metallurgical bond with the inside, outside or both sides of a base metal, i.e. double pipes of a close fitted state or loose fitted state are used, good clad steel pipes can be obtained by fixing both the ends of cladding metal and the ends of base metal firmly through build-up welding and subjecting the double pipes to hot rolling at a temperature of 850° C. to 1300° C.

When clad steel pipes having partially non-bond areas are to be rolled, the end parts containing non-bond parts are sealed by welding but it is preferable to pay attention so that the contact surfaces cannot be oxidized at the time of heating. Further it is preferable to carry out rolling from the side containing less non-bond parts.

In a method in which double pipes of a cladding metal and a base metal of either the close fitted state or the loose fitted state, are sealed at both the ends thereof by welding and are subjected to hot rolling, it has become clear that simple seal welding is not sufficient for the qualities of the products after rolling and sufficient reinforcement welding is necessary to stand the force exerted on both ends of the pipe at the time of hot rolling. More specifically, simple welding of the boundary parts on the end surfaces of a cladding material and a base metal is not sufficient. For example, in the case of close fitted pipes, it is necessary to fix by build-up welding so as to make the depth of welded parts in the longitudinal direction of the cladding metal at least $\frac{1}{3}$ preferably $\frac{1}{2}$ of the thickness of the cladding metal, and in loose fitted pipes, it is necessary to fix by build-up welding so as to make the depth of welded parts in the longitudinal direction of the cladding metal at least $\frac{1}{2}$ preferably $\frac{3}{4}$ of the thickness of the cladding metal. In this case, it is preferable to weld over the entire circumference of both the end parts or at least one end part. If this is neglected, the percentage of bond is lowered.

Particularly, as distinguished from close fitted double pipes, loose fitted double pipes are not subjected to expanding or shrinking, and it is necessary to pay attention to the difference of diameter between the cladding metal and the base metal before fitting.

In general, it is preferable that the difference between the inside diameter of a cladding metal and the outside diameter of a base metal or the difference between the outside diameter of a cladding metal and the inside diameter of a base metal is 7 mm or less. If it is greater than 7 mm, the percentage of bond decreases and the possibility of the occurrence of rolling problems may increase in case of mass production. Particularly, in the case of the double pipes of loose fitted state, removal of air between a cladding metal and a base metal or substitution of the air with inert gas can increase the percentage of bond.

As for means for bringing a cladding metal and a base metal into a close fitted state (metallurgical non-bond), there are an explosion expanding pipe method and a gas explosion method.

As techniques common to the above-mentioned two methods, it is necessary to use a medium material between a cladding metal and a base metal for increasing the percentage of bond and for preventing the migration of carbon from the side of the base metal to the cladding metal. Particularly, when a stainless steel is used for a cladding metal, a medium material is applied to one side or both sides of the contact surface of the base metal and the cladding metal, depending upon a combination of materials of cladding metal and base metal and the desired extent of the percentage of bond of the products.

As for the material of the medium, nickel is most preferable and when a nickel alloy is used, it is preferable to use an alloy as soft as possible in hardness. It has been found that an alloy which is softer than stainless steel is better.

The use of pure iron as a medium is not preferable because suppression of the migration of carbon is difficult and the surface is liable to be oxidized due to heating before rolling.

Among the methods for interposition of a medium there are the electroplating method, metallizing method, etc.

Further, it has been confirmed that the controls of the rolling mechanism at high temperatures and reduction ratio are necessary in the rolling bonding method.

As to the kinds of rolling mills, there can be a hot piercing mill, Plug rolling mill, Mandrel mill, Assel mill, Pilger mill, etc. In order to form a bond by way of rolling, mills other than a Pilger mill are suitable, and a hot piercing mill method is most excellent because it enables the use of a greater rolling ratio (reduction ratio).

It is preferable to carry out the first step rolling with a hot piercing mill and second and subsequent step rollings with a piercing mill or other mills although the rolling manner is not limited only to this manner. It is preferable to complete the bond forming by way of rolling at the longest by three step rolling. It is possible to carry out sizing rolling, stress correction rolling or cold rolling as subsequent steps to the clad steel pipes obtained by roll-bonding by almost the same process as that used for common steel pipes.

With regard to rolling temperature, detailed investigation was carried out, and for the rolling process which forms the metallurgical bond, it has been found that a temperature between 850° C. to 1300° C. is preferable. If a rolling temperature is lower than 850° C., the proportion of forming the metallurgical bond becomes smaller and even once bonded parts often cause discrete bonds. The use of a rolling temperature higher than 1300° C. is not preferable, because a large amount of oxide coating is formed.

Reduction ratio has a large influence upon the percentage of the metallurgical bond. Particularly, the reduction ratio at the time of first and second step rollings has a greater influence and it is preferable to carry out rolling in at least 15% reduction ratio. It is possible to obtain clad steel pipes having extremely large percentage of metallurgical bond if a reduction ratio of 20% or higher is employed.

It is intended to include a case where a solid rod is used for a base metal or a cladding metal which occupies an inside position in the present invention.

Brief description of the accompanying drawings are as follows in which FIGS. 1 to 3 illustrate a method of Example 1; FIGS. 4 to 6 illustrate a method of Example 2; and FIG. 7 illustrates a method of Example 5. Details of the drawings will be mentioned below in Examples.

Following examples are offered by way of illustration but not by way of limitation.

EXAMPLE 1

Figure 1:
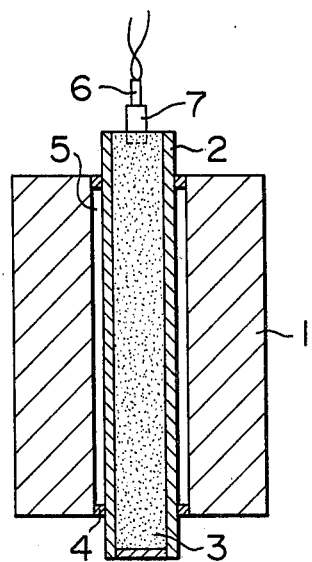
FIG. 1 shows an arrangement in vertical section for preparing double pipes in metallurgical bonding state by explosion welding and a cladding metal is placed in the inside.

As shown in FIG. 1 the inside surface of carbon steel pipe 1 having a thickness of 70 mm, an outside diameter of 230 mm and a length of 1500 mm was polished with a buff to an extent of roughness of 5$\mu$ and plated to give a nickel electroplating having a thickness of 50$\mu$. Separately, a stainless steel pipe 2 [AISI316L] having a thickness of 7 mm, an outside diameter of 80 mm and a length of 1600 mm having been subjected to a solution heat treatment was used as a cladding metal. An explosive for explosion bonding 3 (having an explosion velocity of 2000 m/sec) was placed in the cladding metal. The cladding metal containing the explosive was set in a carbon steel pipe so as to make both the ends of the cladding metal extend out by 50 mm, respectively, and the spacing 5 was set to 5 mm by a spacer 4.

Figure 2:
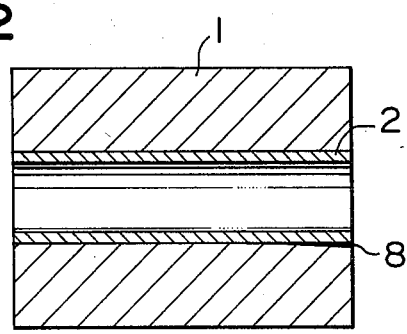
FIG. 2 shows a vertical section of double pipes obtained by explosion welding indicating the presence of partial non-bond area.
Figure 3:
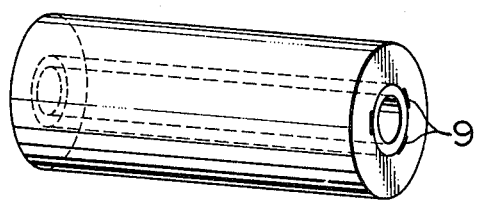
FIG. 3 is a perspective of a clad pipe wherein non-bond area of end surface is sealed by welding.

An electric detonator 6 and 10 g of a high explosion speed explosive (booster) 7 consisting of penthrite and a resin were fixed to the top of explosive 3 and the explosive was exploded to obtain a clad pipe. Before hot rolling this clad pipe, the partial non-bond area 8 of the terminating part surface of explosion bonding shown in FIG. 2 was sealed by welding as shown in the perspective of FIG. 3.

After heating in a heating furnace at 1200° C. for 2 hours, the double pipes were hot-rolled at a stroke by way of a hot piercing mill, starting from the initiated part to obtain a long clad pipe having a thickness of 15 mm, an outside diameter of 196 mm and a length of 6,000 mm. After cutting both the ends of the resulting clad pipe by 200 mm, the state of the metallurgical bond was examined by ultrasonic flaw detection. The half on the side of the initiated part was wholly in the metallurgical bond state and the half on the side of the terminated part was 97% in the metallurgical bond state.

EXAMPLE 2

The inside surface of a carbon steel pipe having a thickness of 70 mm, an outside diameter of 230 mm and a length of 1500 mm was polished with a buff to an extent of roughness of 5$\mu$. Separately, a welded pipe of AISI304L having a thickness of 10 mm, an outside diameter of 86 mm and a length of 1600 mm was subjected to a solution heat treatment and its outside was polished to an extent of roughness of 3$\mu$ and Ni-electroplated to give a 50$\mu$ in thickness.

Figure 4:
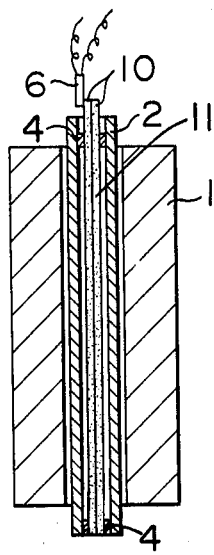
FIG. 4 shows an arrangement in vertical section for preparing close fitted double pipes wherein a cladding metal is placed in the inside.

As shown in FIG. 4, a cladding metal 2 of stainless steel was inserted into a base metal of carbon steel pipe 1 so as to extend from both the ends of the base metal pipe by 50 mm. Further, in the middle inside part of the cladding metal pipe, two detonating fuses 10 having a length of 1700 mm and spacers 4 were inserted and after pouring water in space 11 therein, the detonating fuses 10 were exploded with a detonator 6 to obtain close fitted pipes of a cladding metal 2 and a base metal 1.

Figure 5:
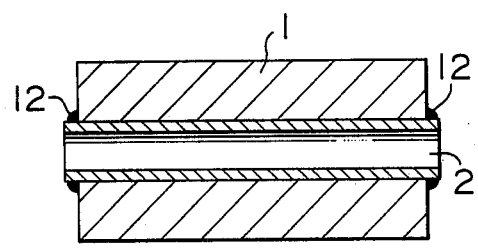
FIG. 5 shows a vertical section of double pipes obtained according to a process of FIG. 4 indicating the end surface working.
Figure 6:
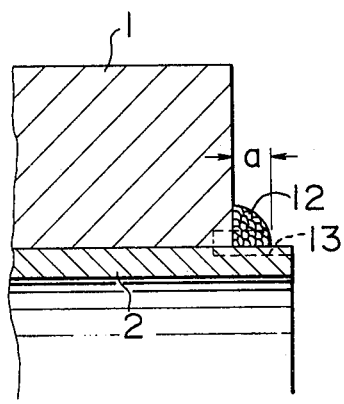
FIG. 6 is an enlarged view of the end part of FIG. 5 after end part working.

As shown in FIG. 5, the cladding metal was cut leaving 10 mm as an extended part, and a build-up welded part 12 was formed with a stainless steel welding rod over the entire circumferences of the cladding metal 2 and the base metal 1. FIG. 6 is a drawing showing the enlarged build-up welded part 12. The width a of the build-up welded part 12 relative to the cladding metal was 7 mm in case of this Example and a firm welding was carried out.

Thereafter air-vent holes 13 were drilled with a drill having a diameter of 5 mm on the build-up welded part 12 of one end part in order to allow the air between the cladding metal 2 and the base metal 1 to escape at the time of heating and rolling.

After heating thus processed pipe materials at a temperature of 1200° C. for 2 hours, the pipe materials were rolled at a stroke with a hot piercing mill to give a thickness of 20 mm (reduction ratio of 74%) with an outside diameter of 150 mm. Subsequent to this step, by using a Plug rolling mill a long length clad pipe having a thickness of 12 mm, and an outside diameter of 130 mm was obtained at a final rolling temperature of 870° C.

Both the ends of the resulting clad steel pipe were cut by 200 mm and the state of the metallurgical bond was examined by ultrasonic flaw detection. It was confirmed that 99% of the total bonded area had been in the state of metal bond.

On the other hand, for comparison's sake, close fitted double pipes were made according to the process same with that above-mentioned. The stainless steel pipe was cut leaving 10 mm extended parts and the stainless steel pipe and the carbon steel pipe were welded thinly (about 2 mm) to give sealing over the entire circumference. Thereafter one air vent hole was bored and rolling was carried out according to the same conditions as above. Both the ends of the resulting clad steel pipe were cut by 200 mm. As the result of ultrasonic flaw detection carried out to examine the bonding state, it revealed that the non-bond areas had been locally scattered in both the end-parts and only 95% of the total bond surface had been in the metallurgical bond state.

EXAMPLE 3

The inside surface of a carbon steel pipe having a thickness of 70 mm, an outside diameter of 230 mm and a length of 1700 mm was polished with a buff to an extent of roughness of 5$\mu$. Separately, the outside surface of a seamless AISI316L stainless steel pipe having a thickness of 10 mm, an outside diameter of 88 mm and a length of 1730 mm was polished to an extent of roughness of $3\mu$. The stainless steel pipe was then inserted into the carbon steel pipe so as to allow both the ends of stainless steel pipe to extend outside both of the ends of carbon steel pipe, each by 15 mm, and both the end parts were firmly welded over the entire circumference of the end parts so that the build-up welded part was at least 10 mm. Thereafter two air vent holes were bored on the welded part of one end with a drill having a diameter of 5 mm. Then the double pipes were rolled with a hot piercing mill at a stroke to a thickness of 14 mm and an outside diameter of 235 mm, starting from the end having no air vent holes, after heating at a temperature of 1200° C. for one hour.

After cutting off both the ends of the resultant clad steel pipe by 200 mm, the state of metallurgical bond was examined by an ultrasonic flaw detection. It was found that 97% of the whole had been in the state of metallurgical bond.

EXAMPLE 4

The inside surface of a carbon steel pipe having a thickness of 70 mm, an outside diameter of 232 mm and a length of 1500 mm was polished with a buff to an extent of roughness of $5\mu$ and then plated to give $10\mu$ Ni-electroplating. Separately, a steel pipe of AISI347 having a thickness of 15 mm, an outside diameter of 88 mm and a length of 1530 mm was subjected to a solution heat treatment and then its outer surface was polished to a roughness of $3\mu$ and Ni-electroplated to $40\mu$ in thickness.

The resulting cladding metal was inserted into the above-mentioned carbon steel with a clearance of about 2 mm so as to make both the ends extend by 15 mm, and firm welding was carried out over the entire end circumference so as to make the build-up welded part occupy at least 10 mm in width.

Thereafter two holes of 5 mm diameter were bored with a drill on one of the welded parts as air-vent holes.

After heating at 1250° C. for one hour, starting from the end containing no air-vent holes, rolling was carried out at a stroke with a hot piercing mill to give a 20 mm thickness and 150 mm outside diameter.

Both the ends of the resulting clad steel pipe were cut by 200 mm and the bond state was examined by ultrasonic flaw detection whereby it was confirmed that 99.5% of the total bond surface had been metallurgically bonded.

EXAMPLE 5

The outside surface of a low alloyed steel rod (SCM22: C 0.20%, Cr 1%, Mo 0.25%) having an outside diameter of 170 mm and a length of 1500 mm was polished with a buff to an extent of roughness of $5\mu$.

Separately, the inside surface of a nickel pipe having a thickness of 10 mm, an outside diameter of 193 mm and a length of 1520 mm was polished to an extent of roughness of $5\mu$.

Figure 7:
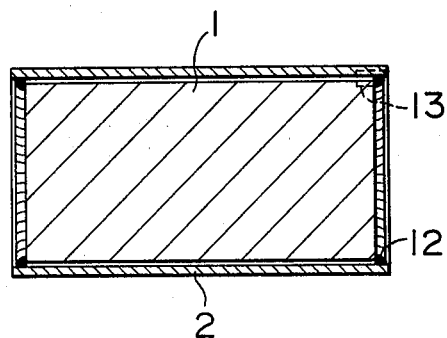
FIG. 7 shows double pipes in loose fitted state in which a cladding metal is placed outside.

As shown in FIG. 7, the above-mentioned nickel pipe 2 as a cladding metal was placed around the base metal 1 consisting of the above-mentioned low alloyed steel rod with a clearance of about 1.5 mm so as to make both the ends of the nickel pipe 2 extend by 10 mm, and welding was carried out firmly over the entire circumferences of both the end parts to give 8 mm build-up welding width 12.

Then on one of the build-up welding parts 12, two air-vent holes 13 were bored with a drill having a diameter of 5 mm.

The resultant composite materials were heated at a temperature of 1200° C. for one hour and then subjected to rolling at a stroke with a hot piercing mill to give a thickness of 20 mm and an outside diameter of 130 mm, starting from the end having no air-vent holes 13.

After cutting both the ends of the clad steel rod by 200 mm, the bond state thereof was examined by ultrasonic flaw detection whereby it was confirmed that about 99% of the total bond surface had been metallurgically bonded.

Separately, by a method similar to the above-mentioned, loose fitted double pipes were prepared, the parts of the nickel pipe which were longer than the inside pipe which was made equal to the length of the low alloyed steel rod by cutting, and the end surfaces between the nickel pipe and the steel pipe were sealed by welding thinly (about 2 mm) over the entire circumferences with a stainless steel welding rod. Thereafter two air-vent holes were provided and rolling was carried out under the same conditions as above-mentioned.

After cutting both the ends of the clad steel pipe thus obtained, having a nickel pipe outside, by 200 mm, the bond state was examined by ultrasonic flaw detection. It was found as the result that non-bond areas were scattered in both the end parts and only 94% of the total bond surface was bonded metallurgically.

EXAMPLE 6

The outside surface of a carbon steel pipe having an outside diameter of 190 mm and a length of 1300 mm was polished with a buff to an extent of roughness of $5\mu$. Separately, after the inside surface of an AISI316L pipe having a thickness of 12 mm, an outside diameter of 215 mm and a length of 1,325 mm was polished with a buff, about $100\mu$ nickel-electroplating (in thickness) was applied to the inside.

The carbon steel pipe was inserted into the AISI316L pipe with a clearance of about 0.7 mm and firm welding was carried out over the entire circumferences so as to make the build-up welded part occupy at least 10 mm. Then one of the welded parts was drilled with a drill having a diameter of 5 mm to form one air-vent hole.

The double pipes were heated at 1250° C. for one hour, and starting from the part having no air vent hole, rolling was carried out at a stroke with a hot piercing mill to give a thickness of 22 mm and an outside diameter of 150 mm.

Both the ends of the clad steel pipe were cut and the bond state was examined, whereby it was confirmed that 99.7% of the total area was metallurgically bonded.

As the result of observation of the boundary portion of the bonding under a microscope, it was confirmed that needless to say that the metallurgically bonded state was attained, but also there was hardly any migration of carbon from the carbon steel to stainless steel side.

Thus the effect of the Ni-electroplating layer used as an intermediate layer was confirmed.

Though not indicated in examples, even after a cladding material was brought to the close or loose fitted state on both the inside and the outside of a base metal, the same process as above-mentioned was carried out. In this case, too, there was obtained an excellent clad steel pipe.

Further in each of the above-mentioned examples, it is possible to replace the inner gas in the inside with an inert gas and then carry out rolling.

As above-explained, according to the method of the present invention it is possible to obtain a long length clad steel pipe having an extremely superior metallurgical bond state easily, with good qualities of product and inexpensive cost as compared with conventional close fitted double pipes.

I claim:

1. A method of producing clad steel pipes using a cylindrically shaped base metal member of a carbon steel and a cylindrically shaped cladding metal member selected from the group consisting of a stainless steel, nickel or a nickel alloy said method comprising:
   (a) positioning said base metal member with respect to said cladding metal member such that the cylindrical surfaces of said base metal member and said cladding metal member are opposed to each other;
   (b) welding at least one edge portion of the shorter of said base metal member or said cladding metal member to the cylindrical surface of the other of said base metal member or said cladding metal member; and
   (c) hot rolling, at least one time, said base metal member and said cladding metal member at a temperature of 850° C.–1300° C. with a reduction ratio of at least 15% in said first hot rolling.

2. A method of producing clad steel pipes according to claim 1 including using a hot piercing mill for said first rolling.

3. A method of producing clad steel pipes by rolling according to claim 1 wherein said base metal member and said cladding metal member are positioned in opposition to one another in a loose fitted state and wherein said welding is a buildup welding.

4. A method of producing a clad steel pipe by rolling according to claim 3 wherein prior to said positioning step a nickel layer is positioned with respect to the cylindrical surfaces of either of said base metal member or said cladding layer member such that after said positioning step said nickel layer is positioned between said opposed cylindrical surfaces.

5. A method of producing clad steel pipes by rolling according to claim 1 wherein said base metal member and said cladding metal member are positioned in opposition in a closefitted state.

6. A method of producing a clad steel pipe by rolling according to claim 5 wherein prior to said positioning step a nickel layer is positioned with respect to the cylindrical surfaces of either of said base metal member or said cladding layer member such that after said positioning step said nickel layer is positioned between said opposed cylindrical surfaces.

7. A method of producing a clad steel pipe by rolling according to claim 6 including bonding said cladding metal member to said base metal member subsequent to said positioning step and prior to said rolling step.

8. A method of producing clad steel pipes by rolling according to claim 1 wherein the thickness of the weld is at least one third the thickness of said cladding metal member.

9. Clad steel pipes prepared by hot rolling according to the method defined in claim 1.

* * * * *